(12) United States Patent
Kumazawa et al.

(10) Patent No.: US 10,099,563 B2
(45) Date of Patent: Oct. 16, 2018

(54) POWER SUPPLY DEVICE FOR VEHICLE AND METHOD FOR CONTROLLING THE SAME

(71) Applicant: TOYOTA JIDOSHA KABUSHIKI KAISHA, Toyota-shi, Aichi-ken (JP)

(72) Inventors: Suguru Kumazawa, Toyota (JP); Hideki Kamatani, Nagoya (JP); Ryoji Sato, Toyohashi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 65 days.

(21) Appl. No.: 15/103,532

(22) PCT Filed: Dec. 4, 2014

(86) PCT No.: PCT/IB2014/002645
§ 371 (c)(1),
(2) Date: Jun. 10, 2016

(87) PCT Pub. No.: WO2015/087123
PCT Pub. Date: Jun. 18, 2015

(65) Prior Publication Data
US 2016/0318404 A1 Nov. 3, 2016

(30) Foreign Application Priority Data
Dec. 12, 2013 (JP) .................... 2013-257036

(51) Int. Cl.
*B60L 1/00* (2006.01)
*B60L 3/00* (2006.01)
(Continued)

(52) U.S. Cl.
CPC ............ *B60L 11/02* (2013.01); *B60L 11/126* (2013.01); *B60L 11/1807* (2013.01);
(Continued)

(58) Field of Classification Search
CPC .... B60L 11/02; B60L 11/126; B60L 11/1807; B60L 11/1809; B60L 15/007;
(Continued)

(56) References Cited

U.S. PATENT DOCUMENTS

2005/0104551 A1 5/2005 Nishimura et al.
2010/0156330 A1 6/2010 Inoue et al.
(Continued)

FOREIGN PATENT DOCUMENTS

| CN | 102460925 A | 5/2012 |
|---|---|---|
| JP | 2004-266935 | 9/2004 |

(Continued)

*Primary Examiner* — Carlos Amaya
(74) *Attorney, Agent, or Firm* — Hunton Andrews Kurth LLP

(57) ABSTRACT

Provided are a power supply device for a vehicle provided with a battery, a converter, and a controller, and a method for controlling the same. The controller controls the converter in a continuous boost mode in which the converter is continuously operated and an intermittent boost mode in which the converter is intermittently operated. The controller does not control the converter in the intermittent boost mode when a control that adjusts a reference point of a resolver of a motor generator is underway.

4 Claims, 8 Drawing Sheets

(51) Int. Cl.
*H02G 3/00* (2006.01)
*B60L 11/02* (2006.01)
*B60L 11/18* (2006.01)
*H02M 3/158* (2006.01)
*H02M 3/156* (2006.01)
*H02M 7/5387* (2007.01)
*H02M 7/5395* (2006.01)
*H02M 7/44* (2006.01)
*B60L 11/12* (2006.01)
*B60L 15/00* (2006.01)
*H02M 1/00* (2006.01)

(52) U.S. Cl.
CPC ......... *B60L 11/1809* (2013.01); *B60L 15/007* (2013.01); *H02M 3/156* (2013.01); *H02M 3/158* (2013.01); *H02M 7/44* (2013.01); *H02M 7/5395* (2013.01); *H02M 7/53871* (2013.01); *B60L 2210/30* (2013.01); *B60L 2210/40* (2013.01); *B60L 2240/526* (2013.01); *B60L 2240/527* (2013.01); *H02M 3/1588* (2013.01); *H02M 2001/007* (2013.01); *H02M 2001/0035* (2013.01); *H02M 2001/0054* (2013.01); *Y02T 10/6217* (2013.01); *Y02T 10/645* (2013.01); *Y02T 10/7005* (2013.01); *Y02T 10/7072* (2013.01); *Y02T 10/7077* (2013.01); *Y02T 10/7241* (2013.01); *Y02T 10/92* (2013.01); *Y02T 90/127* (2013.01); *Y02T 90/14* (2013.01)

(58) Field of Classification Search
CPC ............ B60L 2210/30; B60L 2210/40; B60L 2240/526; B60L 2240/527; H02M 7/44; H02M 3/156; H02M 3/158; H02M 7/53871; H02M 7/5395; H02M 3/1588; H02M 2001/0035
USPC ........................................................ 307/10.1
See application file for complete search history.

(56) References Cited

U.S. PATENT DOCUMENTS

2012/0069613 A1\* 3/2012 Nakagawa ........ H02M 7/53871
363/78
2012/0187887 A1 7/2012 Sone

FOREIGN PATENT DOCUMENTS

| JP | 2005-237149 A | 9/2005 |
| JP | 2009-027774 A | 2/2009 |
| JP | 2010-148271 | 7/2010 |
| JP | 2011-015603 A | 1/2011 |
| JP | 2014-023403 A | 2/2014 |
| WO | 2010/143511 A1 | 12/2010 |

\* cited by examiner

POWER SUPPLY DEVICE FOR VEHICLE AND METHOD FOR CONTROLLING THE SAME

CROSS-REFERENCE TO RELATED APPLICATIONS

This is a national phase application based on the PCT International Patent Application No. PCT/IB2014/002645 filed Dec. 4, 2014, claiming priority to Japanese Patent Application No. 2013-257036 filed Dec. 12, 2013, the entire contents of both of which are incorporated herein by reference.

BACKGROUND OF THE INVENTION

1. Field of the Invention

The invention relates to a power supply device for a vehicle and a method for controlling the same.

2. Description of Related Art

Japanese Patent Application Publication No. 2004-266935 (JP 2004-266935 A) discloses a technique for correcting a deviation between a rotation position of a motor that is detected by a detection device (rotation angle sensor) and an actual rotation position of the motor.

In a case where current consumption in a motor generator is little, it is effective to execute intermittent boost control to reduce electric power loss by operating and stopping a boost converter intermittently.

However, when boosting is stopped, an output voltage of the boost converter diverges from a command voltage with time to become a resultant voltage. When the output voltage of the boost converter is not appropriately controlled according to the command voltage, the deviation between the rotation position of the motor that is detected by the detection device and the actual rotation position of the motor cannot be appropriately corrected as in JP 2004-266935 A.

SUMMARY OF THE INVENTION

In view of the above problem, the invention provides a power supply device for a vehicle that is capable of appropriately correcting a deviation between a rotation position of a motor which is detected by a rotation angle sensor and an actual rotation position of the motor in a vehicle having an intermittent boost control function, and a method for controlling the power supply device.

According to an aspect of the invention, there is provided a power supply device for a vehicle. The power supply device includes an electric power storage device, a boost converter, and a controller. The boost converter is configured to boost voltage of the electric power storage device and the boost converter is configured to supply the boosted voltage to an electric load of the vehicle. The controller is configured to control the boost converter in a continuous boost mode and an intermittent boost mode. The controller is configured to continuously operate the boost converter in the continuous boost mode. The controller intermittently operates the boost converter in the intermittent boost mode. The controller is configured not to control the boost converter in the intermittent boost mode when a control that adjusts a reference point of a rotation position sensor of a motor is underway. (Hereinafter, a control that adjusts a reference point is also referred to as "a reference point adjustment control".)

In the power supply device for the vehicle described above, the controller may be configured to control the boost converter in the intermittent boost mode when the reference point adjustment control of the rotation position sensor of the motor is not underway.

According to the power supply device described above, the boost converter is not controlled in the intermittent boost mode when the reference point adjustment control of the rotation position sensor, in which the motor is required to be controlled with high accuracy, is underway, and thus the reference point adjustment control can be correctly performed. Accordingly, a deviation between a rotation position of the motor and an actual rotation position of the motor can be appropriately corrected. And the deviation between the rotation position of the motor which is detected by a detection device and the actual rotation position of the motor can be suppressed.

In the power supply device described above, the controller may be configured to perform the reference point adjustment control of the rotation position sensor of the motor during an initial operation of the motor.

According to the power supply device for a vehicle described above, the reference point adjustment control can be correctly performed during the initial operation of the motor.

According to another aspect of the invention, there is provided a method for controlling a power supply device for a vehicle. Herein, the vehicle includes a motor, a rotation position sensor, an electric power storage device and a boost converter. The a rotation position sensor is configured to detect a rotation position of the motor. The boost converter is configured to boost voltage of the electric power storage device and the boost converter is configured to supply the boosted voltage to an electric load of the vehicle. The method includes the following:

controlling the boost converter in a continuous boost mode and an intermittent boost mode. The boost converter is continuously operated in the continuous boost mode and the boost converter is intermittently operated in the intermittent boost mode; and not controlling the boost converter in the intermittent boost mode when a control that adjusts a reference point of the rotation position sensor of the motor is underway, and controlling the boost converter in the intermittent boost mode when the control that adjusts the reference point of the rotation position sensor of the motor is not underway.

According to the method for controlling the power supply device for the vehicle described above, the boost converter is not controlled in the intermittent boost mode during the reference point adjustment control of the rotation position sensor, in which the motor is required to be controlled with high accuracy. And the boost converter is controlled in the intermittent boost mode when the reference point adjustment control of the rotation position sensor of the motor is not underway, and thus the reference point adjustment control can be correctly performed. Accordingly, a deviation between a rotation position of the motor and an actual rotation position of the motor can be appropriately corrected. And the deviation between the rotation position of the motor which is detected by a detection device and the actual rotation position of the motor can be suppressed.

According to the power supply device for the vehicle and the method for controlling the power supply device of the invention, a deviation between a rotation position of a motor which is detected by a rotation angle sensor and an actual rotation position of the motor can be appropriately corrected in a vehicle having an intermittent boost control function.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

Figure 4:
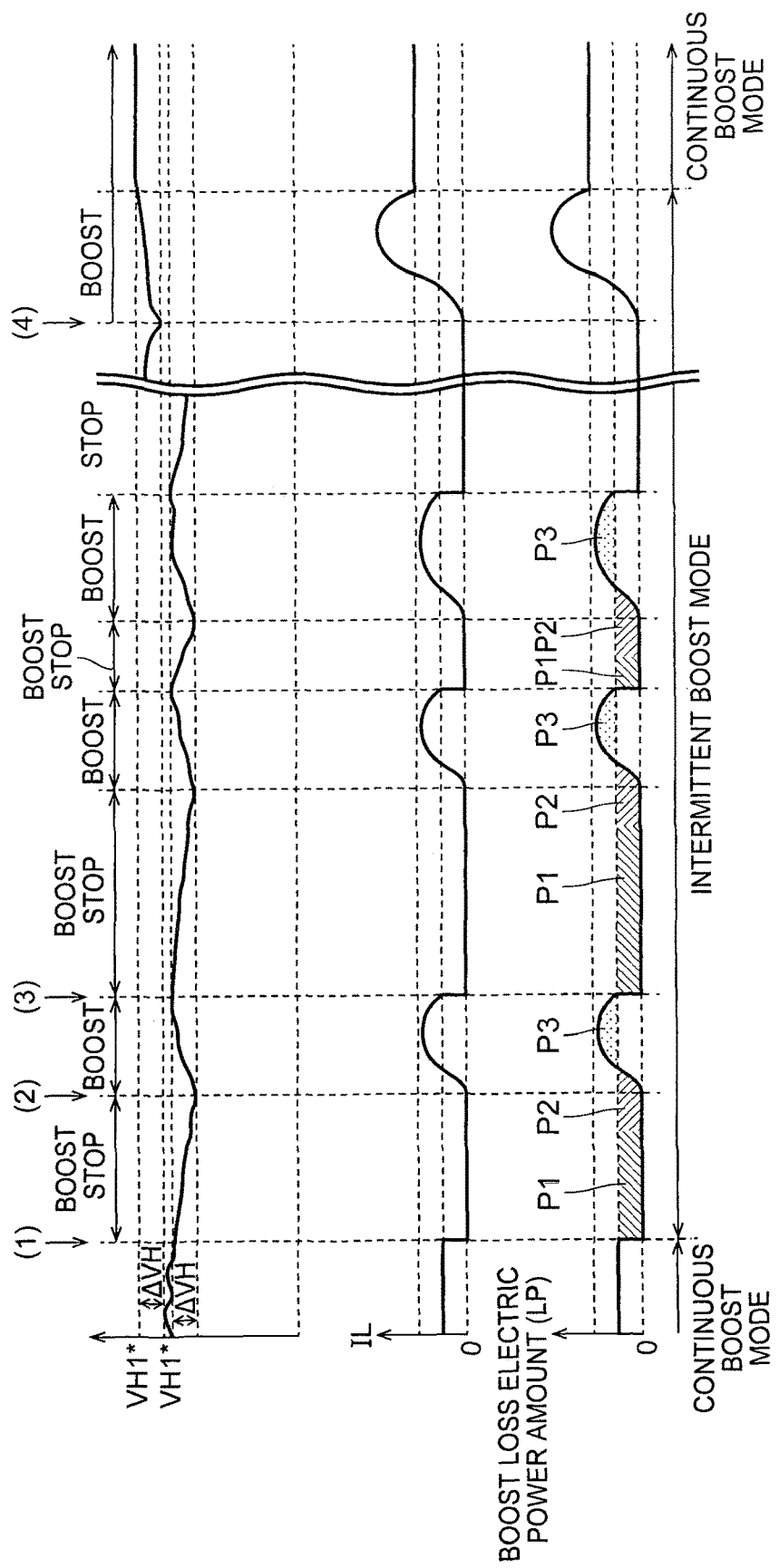
Figure 5:
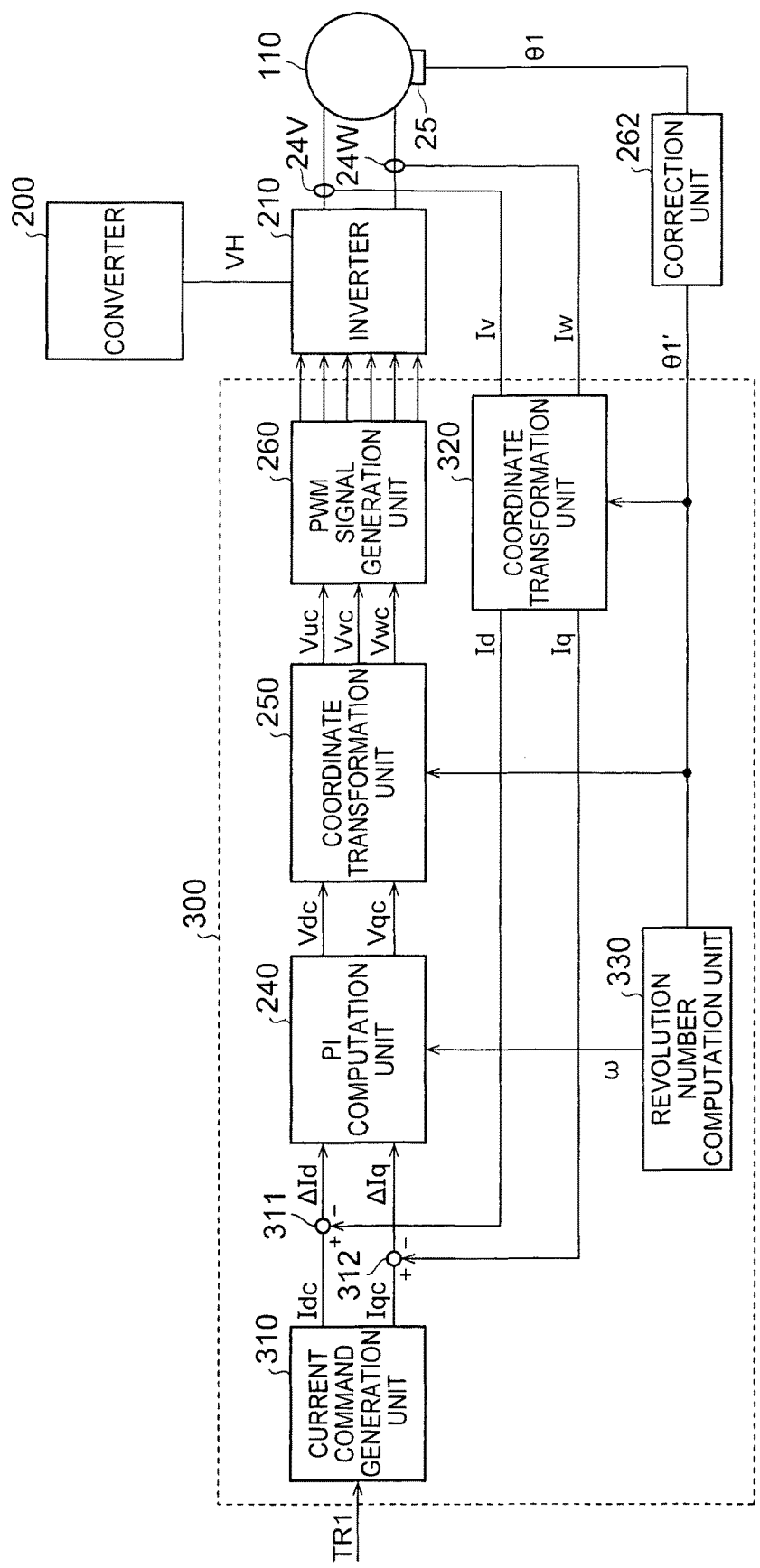
Figure 6:
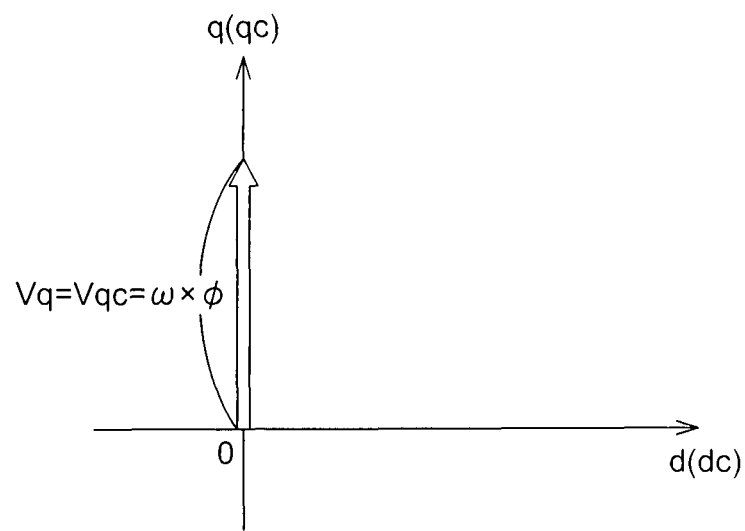
Figure 6:
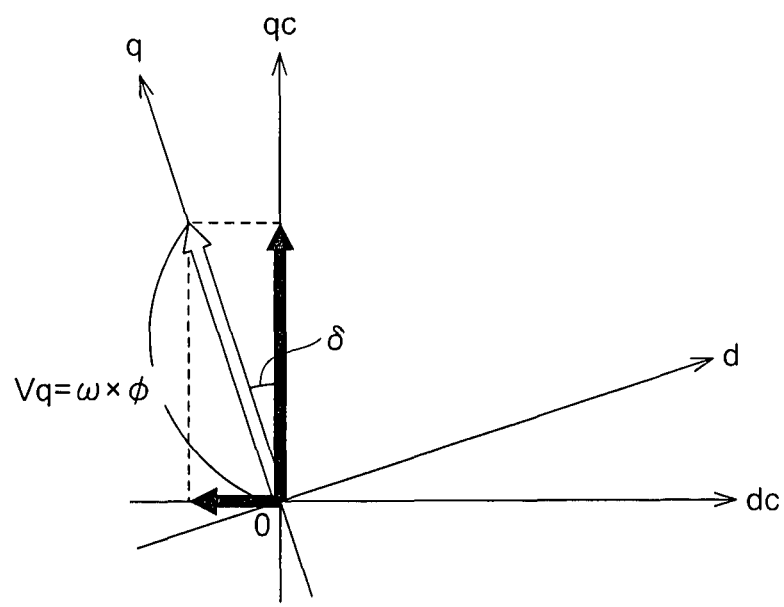
Figure 7:
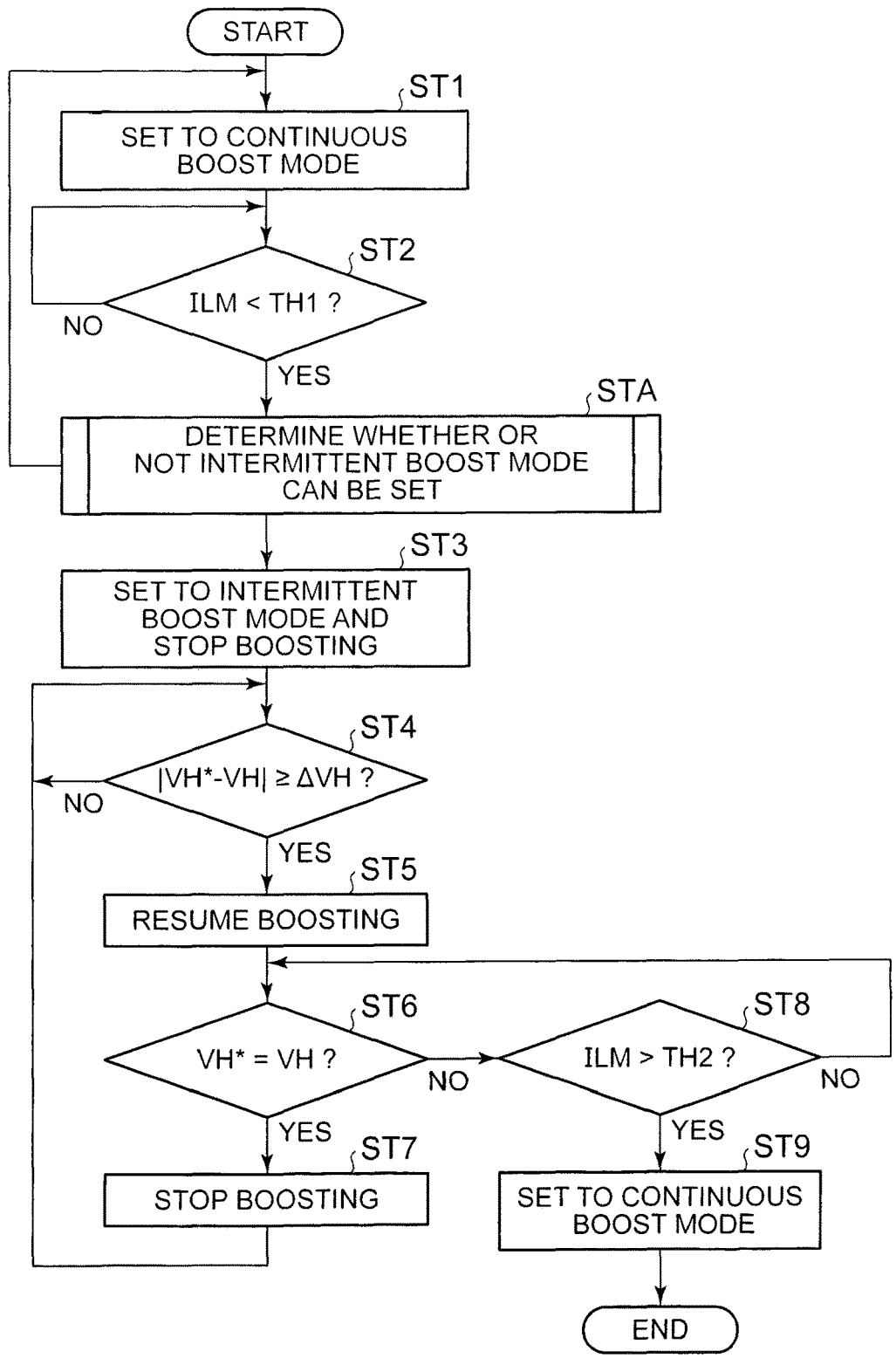
Figure 8:
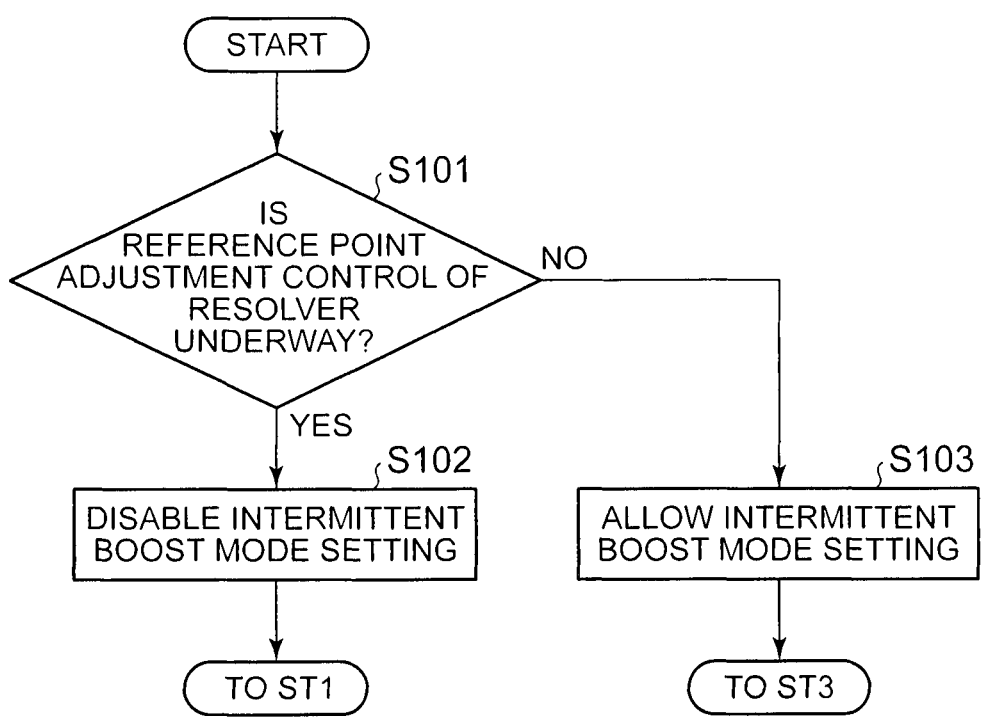

the upper graph in FIG. 4 is a diagram showing an output voltage (system voltage) VH of a converter 200 in a continuous boost mode and an intermittent boost mode the middle graph in FIG. 4 is a diagram showing a reactor current IL in the continuous boost mode and the intermittent boost mode, and the lower graph in FIG. 4 is a diagram showing a boost loss electric power amount LP in the continuous boost mode and the intermittent boost mode;

FIG. 5 is a control block diagram for a PWM control scheme that is executed by an MG-ECU which is provided in the electrical system;

the upper coordinate in FIG. 6 is a diagram showing a coordinate in a zero-current state (when Id is 0 and Iq is 0) in a case where an actual coordinate d-q and a command axis coordinate dc-qc match each other, and the lower coordinate in FIG. 6 is a diagram showing a coordinate in the zero-current state (when Id is 0 and Iq is 0) in a case where the actual coordinate d-q and the command axis coordinate dc-qc are different from each other;

FIG. 7 is a flowchart showing a procedure of boost control by the converter according to this embodiment; and FIG. 8 is a flowchart showing a procedure of Step STA in FIG. 7.

DETAILED DESCRIPTION OF EMBODIMENTS

Figure 1:
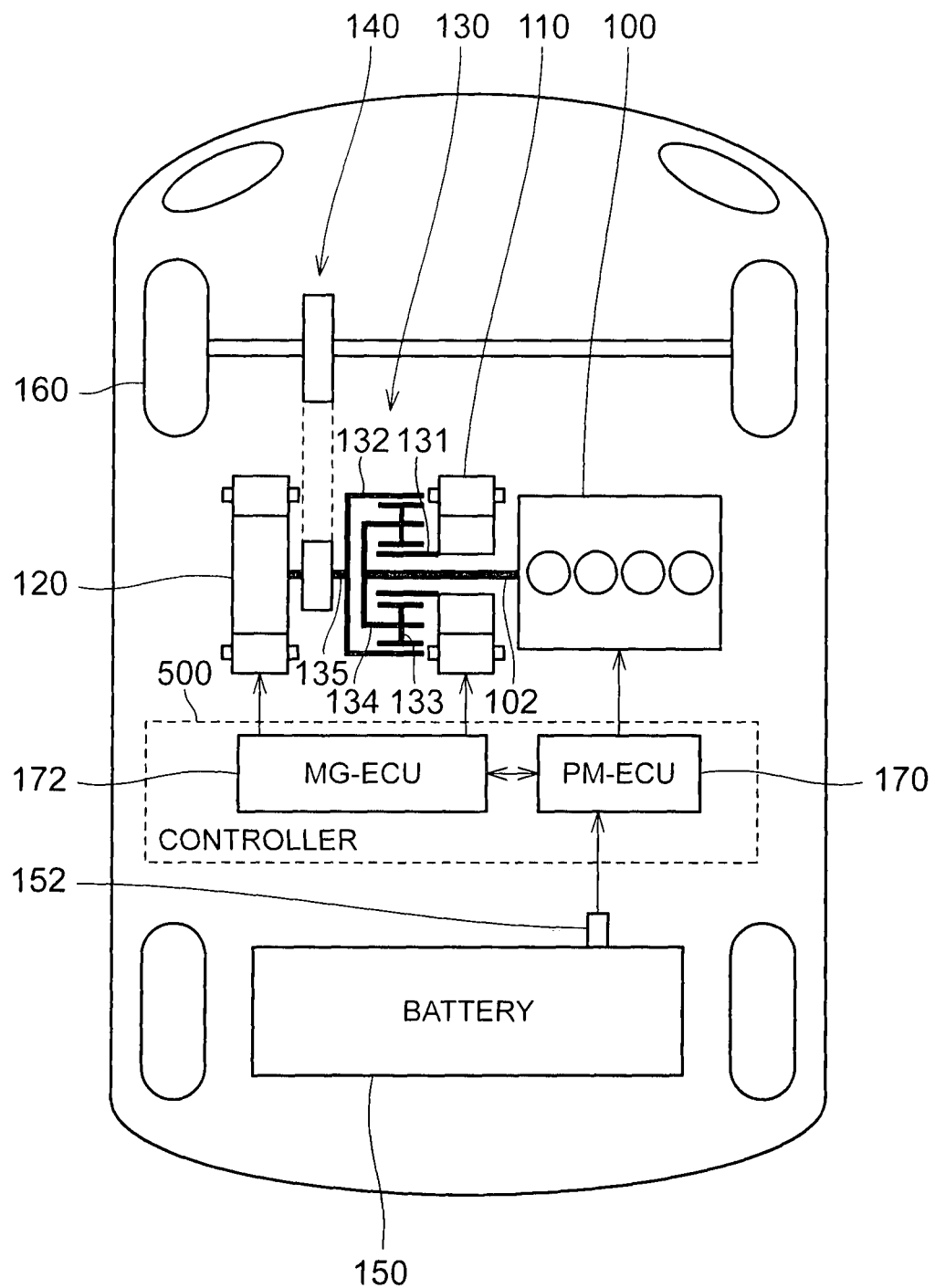
FIG. 1 is a block diagram showing a configuration example of a hybrid vehicle that is illustrated as an example of an electric vehicle on which a power supply device according to an embodiment of the invention is mounted.

FIG. 1 is a block diagram showing a configuration example of a hybrid vehicle that is illustrated as a representative example of an electric vehicle according to an embodiment of the invention.

Referring to FIG. 1, the hybrid vehicle is provided with an engine 100 that corresponds to an "internal combustion engine", a first motor generator (MG) 110, a second MG 120, a power split mechanism 130, a decelerator 140, a battery 150, driving wheels 160, and a controller 500. The controller 500 has a power management-electronic control unit (PM-ECU) 170 and a motor generator-ECU (MG-ECU) 172.

The hybrid vehicle travels by using a driving force from at least one of the engine 100 and the second MG 120. The engine 100, the first MG 110, and the second MG 120 are connected via the power split mechanism 130.

The power split mechanism 130 is configured representatively as a planetary gear mechanism. The power split mechanism 130 includes an external sun gear 131, an internal ring gear 132 that is arranged concentrically with the sun gear 131, a plurality of pinions 133 that are engaged with the sun gear 131 and are engaged with the ring gear 132, and a carrier 134. The carrier 134 is configured to hold the plurality of pinions 133 to be rotatable and revolvable.

Power that is generated by the engine 100 is split into two paths by the power split mechanism 130. One is the path where the driving wheels 160 are driven via the decelerator 140. The other is the path where the first MG 110 is driven for electric power generation.

A representative example of the first MG 110 and the second MG 120 is three-phase AC rotary electric machines constituted by permanent magnet motors.

The first MG 110 is operated mainly as an "electric power generator" and can generate electric power with the driving force from the engine 100 which is split by the power split mechanism 130. The electric power that is generated by the first MG 110 is properly used according to a traveling state of the vehicle and a state of charge (SOC) of the battery 150. Then, the electric power is stored in the battery 150 with voltage adjusted by a converter (described later). The first MG 110 can also be operated as an electric motor, as a result of torque control, in the case of motoring of the engine 100 during engine start and the like.

The second MG 120 is operated mainly as an "electric motor" and is driven by at least one of the electric power that is stored in the battery 150 and the electric power that is generated by the first MG 110. Power that is generated by the second MG 120 is transmitted to a driving shaft 135, and then transmitted to the driving wheels 160 via the decelerator 140. In this manner, the second MG 120 assists the engine 100 or allows the vehicle to travel by using the driving force from the second MG 120.

During regenerative braking of the hybrid vehicle, the second MG 120 is driven by the driving wheels 160 via the decelerator 140. In this case, the second MG 120 is operated as the electric power generator. In this manner, the second MG 120 functions, as a regeneration brake that converts braking energy into electric power. The electric power that is generated by the second MG 120 is stored in the battery 150.

The battery 150 is a battery pack that is configured to have a plurality of serially connected battery modules, and a plurality of battery cells are integrated in each of the battery modules. Voltage of the battery 150 is, for example, approximately 200 V. The battery 150 can be charged with the electric power that is generated by the first MG 110 or the second MG 120. The temperature, voltage, and current of the battery 150 are detected by the battery sensor 152. The battery sensor 152 is a comprehensive designation of a temperature sensor, a voltage sensor, and a current sensor.

The PM-ECU 170 and the MG-ECU 172 are configured to have a central processing unit (CPU, not illustrated) and a memory (not illustrated) built thereinto, and are configured to execute arithmetic processing based on values detected by the respective sensors through software processing according to a map and a program stored in the memory. Alternatively, at least a part of the PM-ECU 170 and the MG-ECU 172 may be configured to execute predetermined mathematical operation processing and/or logical operation processing through hardware processing by a dedicated electronic circuit and the like.

The engine 100 is controlled according to an operation command value from the PM-ECU 170. The first MG 110, the second MG 120, the converter 200, and inverters 210, 220 are controlled by the MG-ECU 172. (Refer to FIG. 2) The PM-ECU 170 and the MG-ECU 172 are connected to be capable of bidirectional communication.

The PM-ECU 170 and the MG-ECU 172 are configured to be separate ECUs in this embodiment. However, a single ECU that performs functions of both the PM-ECU 170 and the MG-ECU 172 may be disposed instead.

Figure 2:
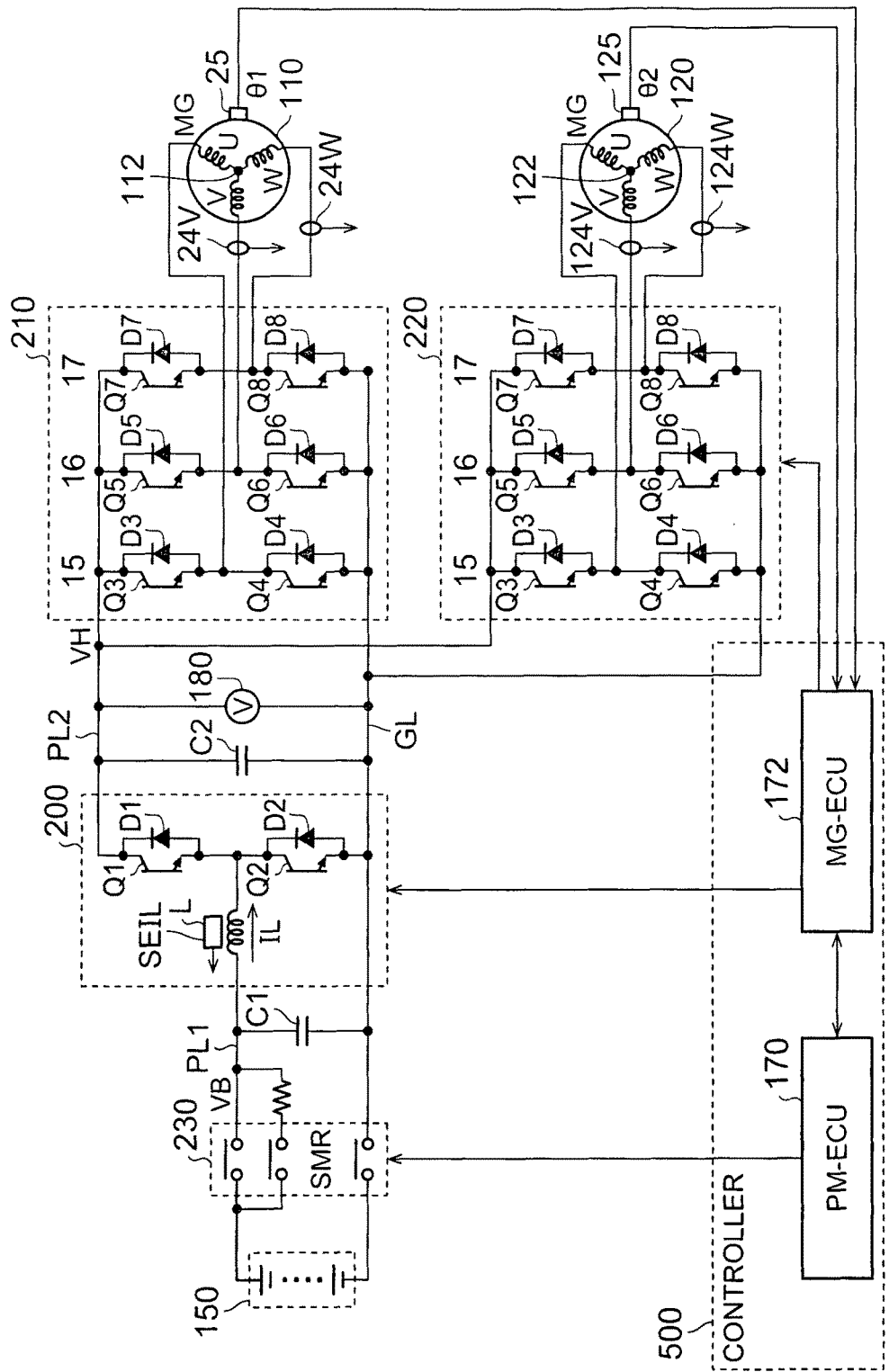
FIG. 2 is a diagram showing an electrical system of the hybrid vehicle.

FIG. 2 is a circuit diagram showing a configuration example of an electrical system of the hybrid vehicle that is illustrated in FIG. 1.

Referring to FIG. 2, the converter 200, the inverter 210 that corresponds to the first MG 110, the inverter 220 that corresponds to the second MG 120, a system main relay (SMR) 230, and condensers C1, C2 are disposed in the electrical system of the hybrid vehicle.

The converter 200 includes two serially connected electric power semiconductor switching elements Q1, Q2 (hereinafter, also referred to simply as "switching elements"), diodes D1, D2 that are disposed to correspond to the respective switching elements Q1, Q2, and a reactor L.

The switching elements Q1, Q2 are serially connected between a positive line PL2 and a grounding line GL that is connected to a negative pole of the battery 150. A collector of the switching element Q1 is connected to the positive line PL2, and an emitter of the switching element Q2 is connected to the grounding line GL. The diodes D1, D2 are anti-parallely connected to the respective switching elements Q1, Q2. The switching element Q1 and the diode D1 constitute an upper arm of the converter 200, and the switching element Q2 and the diode D2 constitute a lower arm of the converter 200.

An insulated gate bipolar transistor (IGBT), a power metal oxide semiconductor (MOS) transistor, a power bipolar transistor, and the like can be appropriately adopted as the electric power semiconductor switching elements Q1, Q2. ON/OFF of each of the switching elements Q1, Q2 is controlled by a switching control signal from the MG-ECU 172.

One end of the reactor L is connected to a positive line PL1 that is connected to a positive pole of the battery 150, and the other end of the reactor L is connected to a connection node for the switching elements Q1, Q2, that is, a connection point between an emitter of the switching element Q1 and a collector of the switching element Q2.

The condenser C2 is connected between the positive line PL2 and the grounding line GL. The condenser C2 smoothens an AC component of voltage variation between the positive line PL2 and the grounding line GL. The condenser C1 is connected between the positive line PL1 and the grounding line GL. The condenser C1 smoothens an AC component of voltage variation between the positive line PL1 and the grounding line GL.

A current IL flowing in the reactor L (hereinafter, referred to as a reactor current) is detected by a current sensor SEIL. A voltage sensor 180 detects inter-terminal voltage of the condenser C2 that is output voltage of the converter 200, that is, voltage VH (system voltage) between the positive line PL2 and the grounding line GL. The converter 200 that outputs the detected value to the MG-ECU 172 is electrically connected to the inverter 210 and the inverter 220 via the positive line PL2 and the grounding line GL.

During a boost operation, the converter 200 boosts a DC voltage VB (voltage at both ends of the condenser C1) that is supplied from the battery 150, and supplies the boosted system voltage VH to the inverters 210, 220. More specifically, an ON period of the switching element Q1 and an ON period of the switching element Q2 alternate in response to the switching control signal from the MG-ECU 172. A boost ratio corresponds to a ratio between the ON periods.

In a step-down operation, the converter 200 steps down the system voltage VH that is supplied from the inverters 210, 220 via the condenser C2 and charges the battery 150. More specifically, a period when only the switching element Q1 is ON and a period when both of the switching elements Q1, Q2 are OFF alternate in response to the switching control signal from the MG-ECU 172. A step-down ratio corresponds to a duty ratio of the ON period.

When the boost/step-down by the converter 200 is stopped, the switching element Q1 is set ON-fixed and the switching element Q2 is set OFF-fixed.

The inverter 210 is configured to be a general three-phase inverter. The inverter 210 has a U-phase arm 15, a V-phase arm 16, and a W-phase arm 17 that are disposed in parallel between the positive line PL2 and the grounding line GL. The arm of each of the phases is configured to have switching elements that are serially connected between the positive line PL2 and the grounding line GL. For example, the U-phase arm 15 has switching elements Q3, Q4, the V-phase arm 16 has switching elements Q5, Q6, and the W-phase arm 17 has switching elements Q7, Q8. Anti-parallel diodes D3 to D8 are connected to the respective switching elements Q3 to Q8. ON/OFF of the switching elements Q3 to Q8 is controlled by the switching control signal from the MG-ECU 172.

The first MG 110 has star-connected U-phase, V-phase, and W-phase coils as stator windings. Ends of the coils of the respective phases are connected to each other at a neutral point 112. The other ends of the coils of the respective phases are connected to respective connection points between the switching elements of the arms of the respective phases of the inverter 210.

When the vehicle is traveling, the inverter 210 controls a current or a voltage of the coil of each of the phases of the first MG 110 so that the first MG 110 is operated according to the operation command value (representatively, torque command value) that is set so as to generate the driving force (vehicle driving torque, electric power generation torque, and the like) which is required for the traveling of the vehicle. In other words, the inverter 210 executes bidirectional DC/AC electric power conversion between the positive line PL2 and the first MG 110.

The inverter 220 is configured to be a general three-phase inverter as with the inverter 210. The second MG 120 has star-connected U-phase, V-phase, and W-phase coils as stator windings as with the first MG 110. Ends of the coils of the respective phases are connected to each other at a neutral point 122. The other ends of the coils of the respective phases are connected to respective connection points between the switching elements of the arms of the respective phases of the inverter 220.

When the vehicle is traveling, the inverter 220 controls a current or a voltage of the coil of each of the phases of the second MG 120 so that the second MG 120 is operated according to the operation command value (representatively, torque command value) that is set so as to generate the driving force (vehicle driving torque, regenerative braking torque, and the like) which is required for the traveling of the vehicle. In other words, the inverter 220 executes bidirectional DC/AC electric power conversion between the positive line PL2 and the second MG 120.

A resolver (also referred to as a rotation angle sensor or a rotation position sensor) 25 detects a rotation angle θ1 of the first MG 110. A resolver 125 detects a rotation angle θ2 of the second MG 120. A current sensor 24v detects a V-phase current Iv flowing in the first MG 110. A current sensor 24w detects a W-phase current Iw flowing in the first MG 110. A current sensor 124v detects the V-phase current Iv flowing in the second MG 120. A current sensor 124w detects the W-phase current Iw flowing in the second MG 120.

The MG-ECU 172 generates the switching control signal that controls ON/OFF of the switching elements which constitute the inverters 210, 220 according to PWM control.

The PM-ECU 170 calculates a torque command value TR1 of the first MG 110 and a torque command value TR2 of the second MG 120 based on an accelerator opening Acc and a vehicle speed V of the hybrid vehicle.

The MG-ECU 172 calculates an optimum value (target value) of the output voltage (system voltage) VH of the converter 200, that is, a command voltage VH*, based on the torque command value TR1 of the first MG 110 and the torque command value TR2 of the second MG 120 calculated by the PM-ECU 170, a motor revolution number MRN1 of the first MG 110, and a motor revolution number MRN2 of the second MG 120. The MG-ECU 172 calculates a duty ratio based on the output voltage VH of the converter 200 detected by the voltage sensor 180 and the command voltage VH*, so as to control the output voltage VH to the command voltage VH*, and controls the converter 200.

The MG-ECU 172 controls the converter 200 by setting the converter 200 in one of a continuous boost mode and an intermittent boost mode. The continuous boost mode is a mode in which the converter 200 executes the boost operation without stopping the boost operation. In the continuous boost mode, the voltage that is supplied from the battery 150 is supplied to the inverters 210, 220 via the converter 200. Accordingly, the continuous boost mode includes a case where the voltage of the battery 150 is supplied to the inverters 210, 220 as it is, without being boosted, via the converter 200 (that is, at a duty ratio of 1).

The intermittent boost mode is a mode in which the converter 200 intermittently repeats the boost operation and stopping of the boost operation. ON/OFF of the switching elements Q1, Q2 are switched when the converter 200 executes the boost operation. The switching element Q1 is set ON-fixed and the switching element Q2 is set OFF-fixed when the converter 200 stops the boost operation. When the converter 200 stops the boost operation, the voltage of the battery 150 is not supplied to the inverters 210, 220 via the converter 200.

Figure 3:
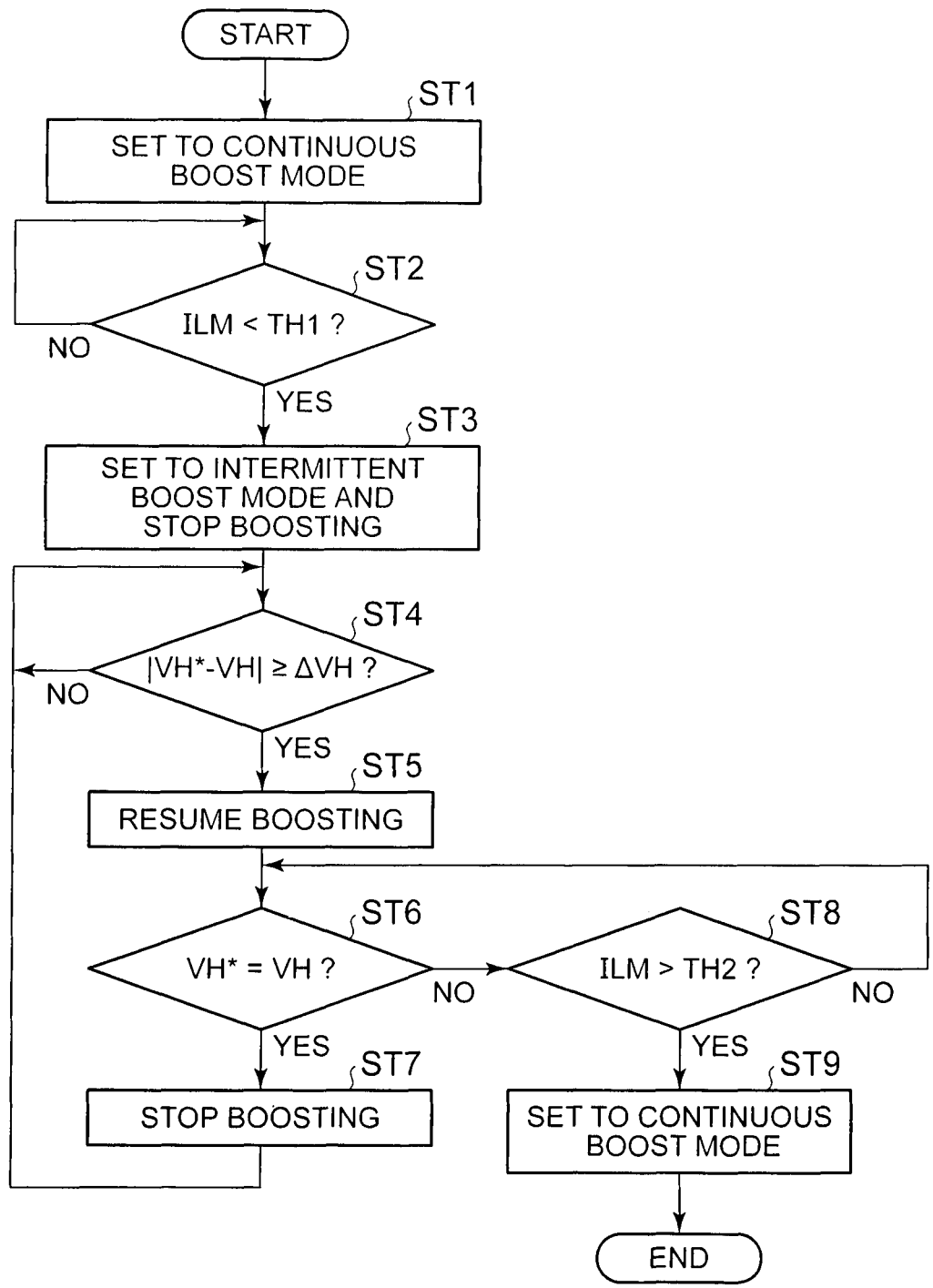
FIG. 3 is a flowchart showing a procedure of normal boost control by a converter that is provided in the electrical system.

FIG. 3 is a flowchart showing a procedure of normal boost control by the converter 200. The boost control according to this embodiment will be described later. The upper graph in FIG. 4 is a diagram showing the output voltage (system voltage) VH of the converter 200 in the continuous boost mode and the intermittent boost mode. The middle graph in FIG. 4 is a diagram showing the reactor current IL in the continuous boost mode and the intermittent boost mode. The reactor current IL varies according to switching by the converter 200 in actuality. However, a switching-based variation component is smoothened in the middle graph in FIG. 4. The lower graph in FIG. 4 is a diagram showing a switching-based boost loss electric power amount LP in the continuous boost mode and the intermittent boost mode.

Referring to FIGS. 2, 3, and 4, the controller 500 sets the converter 200 in the continuous boost mode in Step ST1. The converter 200 executes the boost operation without stopping the boost operation.

Then, the controller 500 allows the process to proceed to Step ST3 when an average value ILM of the reactor current IL for a predetermined past period is lower than a threshold TH1 in Step ST2.

In Step ST3, the controller 500 sets the converter 200 in the intermittent boost mode. In addition, the controller 500 stops the boost operation by the converter 200 (for example, refer to time point (1) in FIG. 4). Herein, after the setting of the intermittent boost mode, the boost operation by the converter 200 may be stopped immediately or the boost operation by the converter 200 may be stopped after a predetermined length of time. In this embodiment, an operation in which a boost-allowed state and a boost-disabled state are repeated is defined as the intermittent boost mode.

When the boost operation by the converter 200 is stopped, the current from the battery 150 is not output, and thus the reactor current IL becomes zero and the boost loss electric power amount LP becomes zero. When the boost operation by the converter 200 is stopped, the first MG 110 and/or the second MG 120 are/is driven by the electric power that is stored in the condenser C2. Charge release from the condenser C2 decreases the system voltage VH.

Then, the controller 500 allows the process to proceed to Step ST5 when a divergence amount |VH*−VH| between the system voltage VH and the command voltage VH* is equal to or higher than a limit value ΔVH in Step ST4. In Step ST5, the controller 500 resumes the boost operation by the converter 200 (for example, refer to time point (2) in FIG. 4).

When the boost operation by the converter 200 is resumed, a current (return current) that is required for driving the first MG 110 and/or the second MG 120 while charging the condenser C2 is supplied from the battery 150, and thus the reactor current IL increases and the boost loss electric power amount LP increases.

Then, the controller 500 allows the process to proceed to Step ST7 when the system voltage VH is equal to the command voltage VH* in Step ST6. In Step ST7, the controller 500 stops the boost operation by the converter 200 (for example, refer to time point (3) in FIG. 4).

The controller 500 sets the converter 200 in the continuous boost mode (Step ST9) when the average value ILM of the reactor current IL for a predetermined past period exceeds a threshold TH2 in Step ST8. The converter 200 executes the boost operation without stopping the boost operation (for example, refer to time point (4) in FIG. 4). It is illustrated in FIG. 4 that the command voltage VH* increases and the reactor current IL increases at time point (4).

The lower graph in FIG. 4 illustrates how much the boost loss electric power amount LP is reduced when one boost stop period and the subsequent boost period of the intermittent boost mode are one set. The area P3 of a region between a line showing the boost loss electric power amount LP above a reference loss electric power BS and a line showing the reference loss electric power BS shows the sum of the boost loss electric power amount LP that is increased compared to an operation in the continuous boost mode. The area P0 of a region between a line showing the boost loss electric power amount LP below the reference loss electric power BS and the line showing the reference loss electric power BS shows the sum of the boost loss electric power amount that is decreased compared to an operation in the continuous boost mode. A value P1, which is obtained by subtracting the P2 (=P3) from the P0 is the sum of the boost loss electric power amount that is reduced due to an operation in the intermittent boost mode, which is compared to an operation in the continuous boost mode, in one set of the boost stop period and the subsequent boost period.

As illustrated in the lower graph in FIG. 4, setting in the intermittent boost mode allows the boost loss electric power amount to be decreased. The longer the boost stop period, the greater a loss reduction effect.

Next, a control that adjusts a reference point of the resolvers 25, 125 will be described. (Hereinafter, a control that adjusts a reference point is also referred to as "a reference point adjustment control".) FIG. 5 is a control block diagram for a PWM control scheme that is executed by the MG-ECU 172. As illustrated in FIG. 5, a PWM control block 300 includes a current command generation unit 310, coordinate transformation units 250, 320, a revolution number computation unit 330, a PI computation unit 240, a PWM signal generation unit 260, and a correction unit 262. Only a configuration for describing control of the first MG 110 is illustrated in FIG. 5. However, the MG-ECU 172 has a similar PWM control block so as to control the second MG 120.

The resolver 25 detects the rotation angle θ1 of the first MG 110. The current sensor 24v detects the V-phase current Iv flowing in the first MG 110 and outputs the detected V-phase current Iv to the PWM control block 300. The current sensor 24w detects the W-phase current Iw flowing in the first MG 110 and outputs the detected W-phase current Iw to the PWM control block 300. The sum of instantaneous values of the three-phase currents Iu, Iv, Iw is zero, and thus an arrangement for detecting motor currents of two phases (for example, the V-phase current Iv and the W-phase current Iw) as illustrated in FIG. 1 suffices.

The current command generation unit 310 generates a d-axis current command value Idc and a q-axis current command value Iqc that are required for generating torque which corresponds to the torque command value TR1 of the first MG 110 set by the PM-ECU 170 in the first MG 110 according to a table produced in advance.

The correction unit 262 outputs a rotation angle θ1' that is corrected by subtracting an offset angle δ from the rotation angle θ1 of the first MG 110 which is detected by the resolver 25. A method for calculating the offset angle δ will be described later.

The coordinate transformation unit 320 performs coordinate transformation on the V-phase current Iv and the W-phase current Iw on a three-phase AC coordinate, which is a stationary coordinate detected by the current sensors 24v, 24w, through coordinate transformation (three-phase to two-phase) using the rotation angle θ1' corrected from the rotation angle θ1 of the first MG 110 detected by the resolver 25, and calculates a d-axis current Id and a q-axis current Iq on a command axis coordinate dc-qc.

The revolution number computation unit 330 calculates a rotation angle speed ω of the first MG 110 based on the rotation angle θ1'.

A subtraction unit 311 outputs a deviation ΔId (ΔId=Idc−Id) with respect to the command value of the d-axis current. A subtraction unit 312 outputs a deviation ΔIq (ΔIq=Iqc−Iq) with respect to the command value of the q-axis current.

The deviation ΔId (ΔId=Idc−Id) with respect to the command value of the d-axis current and the deviation ΔIq (ΔIq=Iqc−Iq) with respect to the command value of the q-axis current are input into the PI computation unit 240. The PI computation unit 240 uses the rotation angle speed ω to perform proportional integral (PI) computation by a predetermined gain with regard to the d-axis current deviation ΔId and the q-axis current deviation ΔIq, obtains a control deviation, and calculates a d-axis voltage command value Vdc and a q-axis voltage command value Vqc, which are command values of applied voltage in respective axial directions on the command axis coordinate dc-qc, according to the control deviation.

The coordinate transformation unit 250 converts the d-axis voltage command value Vdc and the q-axis voltage command value Vqc into respective voltage command values Vuc, Vvc, Vwc of the U phase, the V phase, and the W phase on the three-phase AC coordinate, which is the stationary coordinate, through coordinate transformation (two-phase to three-phase) using the rotation angle θ1' of the first MG 110.

The PWM signal generation unit 260 generates a switching control signal based on comparison between the voltage command values Vuc, Vvc, Vwc of the respective phases and a predetermined carrier wave. The inverter 210 is switching-controlled according to the switching control signal that is generated by the PWM control block 300 so that an AC voltage for outputting torque according to the torque command value TR1 which is input into the current command generation unit 310 is applied.

A closed loop that controls the motor current to the current command values (Idc, Iqc) according to the torque command value TR1 is configured in this manner, and thus output torque of the first MG 110 is controlled according to the torque command value TR1.

Next, a method for obtaining the offset angle δ with the correction unit 262 will be described. An actual coordinate d-q is a coordinate on which an actual field direction of a rotor is a d axis and a direction orthogonal to the d axis is a q axis. The command axis coordinate dc-qc is a coordinate that is defined by the rotation angle θ1 which is detected by the resolver 25. A motor voltage equation on the actual coordinate d-q can be shown as the following equations (1) and (2).

$$Vd = R \times Id - \omega \times Lq \times Iq \qquad (1)$$

$$Vq = R \times Iq + \omega \times Ld \times Id + \omega \times \Phi \qquad (2)$$

Herein, Vd is a d-axis voltage, Vq is a q-axis voltage, R is a 1-phase resistance value, Id is the d-axis current, Iq is the q-axis current, Ld is a d-axis inductance, Lq is a q-axis inductance, ω is the rotation angle speed, and Φ is a magnetic flux in a permanent magnet or a field winding.

As illustrated on the upper coordinate in FIG. 6, Vdc and Vd equal to zero and Vqc and Vq equal to ω×Φ in a zero-current state (when Id is 0 and Iq is 0) in the equations (1) and (2) above in a case where the actual coordinate d-q matches the command axis coordinate dc-qc.

It is assumed that, in the zero-current state (when Id is 0 and Iq is 0), a magnetic pole detection position has an error with respect to a true magnetic pole position. For example, it is assumed that the command axis coordinate dc-qc has an offset of angle ρ with respect to the actual coordinate d-q as illustrated on the lower coordinate in FIG. 6. In this case, Vdc equals to ω×Φ×sin δ and Vqc equals to ω×Φ×cos δ, and Vdc is not zero. Accordingly, it is required to correct a deviation between a rotation position of the first MG 110 which is obtained from output of the resolver 25 and an actual rotation position of the first MG 110.

During the reference point adjustment control of the resolvers 25, 125, the correction unit 262 obtains the d-axis voltage command value Vdc and the q-axis voltage command value Vqc in the zero-current state (Id=0 and Iq=0), and calculates the offset angle δ by the following equation (3).

$$\delta = \tan^{-1}(Vdc/Vqc) \qquad (3)$$

Herein, the control of the first MG 110 and the second MG 120 is not appropriately performed when the offset angle δ is erroneous. Accordingly, it is required to obtain the offset angle δ with high accuracy.

The reference point adjustment control of the resolvers 25, 125, that is, the calculation of the offset angle δ, is performed during an initial motor operation. The initial motor operation includes during factory shipment of the vehicle, during exchange of the first MG 110 or the second MG 120 by a dealer, and after exchange of a power control unit (PCU) including the converter 200, and the inverters 210, 220 by a dealer. During the reference point adjustment control of the resolvers 25, 125, the correction unit 262 obtains the d-axis voltage command value Vdc and the q-axis voltage command value Vqc in the zero-current state (Id=0 and Iq=0). However, when the system voltage VH that is input voltage of the inverter 210 is not controlled in the boost stop period in the intermittent boost mode, the motor currents (Iu, Iv, Iw) output from the inverter 210 vary not to become values specified by the d-axis voltage command value Vdc and the q-axis voltage command value Vqc. As a result, the d-axis current Id and the q-axis current Iq do not become the values specified by the d-axis voltage command value Vdc and the q-axis voltage command value Vqc, it becomes impossible to give correct values as the Vdc and the Vqc of the equation (3), and the obtained offset angle δ becomes an incorrect value. In this embodiment, the controller 500 does not control the converter 200 in the intermittent boost mode during the reference point adjustment control of the resolvers 25, 125 in order to avoid this problem.

FIG. 7 is a flowchart showing a procedure of boost control by the converter 200 according to this embodiment. The flowchart in FIG. 7 differs from the flowchart in FIG. 3 in that Step STA is provided between Step ST2 and Step ST3 in the flowchart in FIG. 7. FIG. 8 is a flowchart showing a procedure of Step STA in FIG. 7.

Referring to FIG. 8, the controller 500 sets intermittent boost control of the converter 200 disabled and allows the process to proceed to Step ST1 in a case where the reference point adjustment control of the resolver 25 or the resolver 125 is underway (YES in Step S101). The controller 500 sets the intermittent boost control of the converter 200 allowed and allows the process to proceed to Step ST3 in a case where the reference point adjustment control of the resolver 25 or the resolver 125 is not underway (NO in Step S101).

According to this embodiment, the converter is not controlled in the intermittent boost mode during the reference point adjustment control of the resolver in the vehicle having the intermittent boost control function as described above. Accordingly, the offset angle δ can be calculated with accuracy, and the first MG and the second MG can be appropriately controlled.

The invention is not limited to the embodiment described above. For example, an operation in the continuous boost mode is performed in a case where intermittent boost mode control is set disabled according to the embodiment of the invention, but the invention is not limited thereto. Step-down by the converter may be executed, even in a case where the intermittent boost mode control is disabled, if not boost but the step-down is required. Also, the boost/step-down of the converter may be stopped when the boost/step-down is not required.

The invention claimed is:

1. A power supply device for a vehicle, the power supply device comprising:
an electric power storage device;
a boost converter configured to boost voltage of the electric power storage device, the boost converter being configured to supply the boosted voltage to an electric load of the vehicle; and
a controller configured to control the boost converter in a continuous boost mode and an intermittent boost mode, the controller being configured to continuously operate the boost converter in the continuous boost mode, the controller being configured to intermittently operate the boost converter in the intermittent boost mode, and when a control that adjusts a reference point of a rotation position sensor of a motor is underway, the controller being configured not to control the boost converter in the intermittent boost mode and being configured to control the boost converter in the continuous boost mode.

2. The power supply device according to claim 1, wherein the controller is configured to control the boost converter in the intermittent boost mode when the control that adjusts the reference point of the rotation position sensor of the motor is not underway.

3. The power supply device for according to claim 1, wherein
the controller is configured to perform the control that adjusts the reference point of the rotation position sensor of the motor during an initial operation of the motor.

4. A method for controlling a power supply device for a vehicle, the vehicle including:
a motor;
a rotation position sensor configured to detect a rotation position of the motor;
an electric power storage device; and
a boost converter configured to boost voltage of the electric power storage device and configured to supply the boosted voltage to an electric load of the vehicle, the method comprising:
controlling the boost converter in a continuous boost mode and an intermittent boost mode, the boost converter being continuously operated in the continuous boost mode and the boost converter being intermittently operated in the intermittent boost mode, and when a control that adjusts a reference point of the rotation position sensor of the motor is underway,
not controlling the boost converter in the intermittent boost mode, and controlling the boost converter in the continuous boost mode.

* * * * *